No. 740,324. PATENTED SEPT. 29, 1903.
M. F. SIMPSON.
SALT RECEPTACLE.
APPLICATION FILED DEC. 27, 1902.
NO MODEL.

Witnesses
Geo. Ackman Jr.
Herbert D. Lawson.

Inventor
Marietta F. Simpson
By Victor J. Evans
Attorney

No. 740,324.

Patented September 29, 1903.

UNITED STATES PATENT OFFICE.

MARIETTA F. SIMPSON, OF PITTSBURG, PENNSYLVANIA.

SALT-RECEPTACLE.

SPECIFICATION forming part of Letters Patent No. 740,324, dated September 29, 1903.

Application filed December 27, 1902. Serial No. 136,840. (No model.)

*To all whom it may concern:*

Be it known that I, MARIETTA F. SIMPSON, a citizen of the United States, residing at Pittsburg, in the county of Allegheny and State of Pennsylvania, have invented new and useful Improvements in Salt-Receptacles, of which the following is a specification.

My invention relates to new and useful improvements in a combined dispensing device and holder for salt, sugar, and other granular substances; and its object is to provide a receptacle of simple construction having an outlet-spout which is adapted to operate a valve whereby the contents of the receptacle may be discharged automatically by gravity.

A further object is to provide a crushing device which is operated in unison with the valve.

With the above and other objects in view the invention consists in providing a receptacle having an outlet at the bottom thereof which is normally closed by a valve connected to a revoluble spout inclosing and extending from the outlet. A forked bar is secured to this valve and extends upward into the receptacle at a point above the outlet and is adapted when the valve is operated to revolve and pulverize any lumps which may accumulate within the outlet.

The invention also consists in the further novel construction and combination of parts hereinafter more fully described and claimed, and illustrated in the accompanying drawings, forming a part of this specification, and in which—

Figure 1:
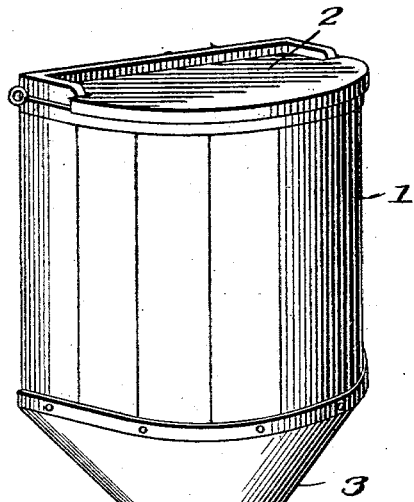
Figure 3:
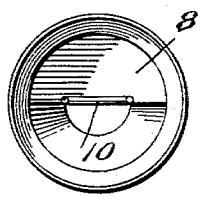
Figure 4:
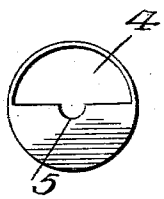
Figure 2:
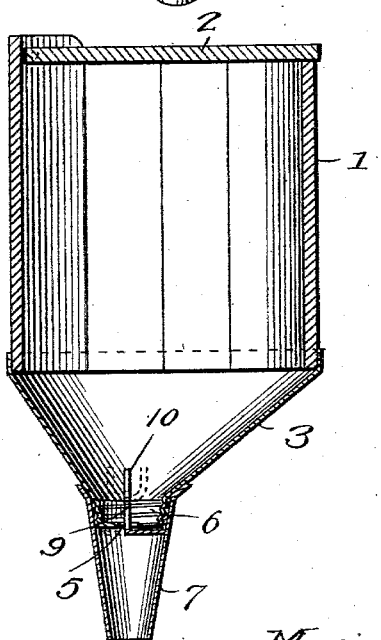

Figure 1 is a perspective view of the device. Fig. 2 is a central vertical section therethrough. Fig. 3 is a plan view of the spout and valve detached, and Fig. 4 is an end view of the outlet in the bottom of the receptacle.

Referring to the figures by numerals of reference, 1 is a receptacle of suitable form, which may be provided with a hinged lid 2, whereby the same may be readily filled. The receptacle is provided with a conical bottom 3, having an outlet 4 at the lowest point therein, said outlet being preferably semicircular in form, as illustrated in Fig. 4, and having a recess 5, formed within the center of the straight edge thereof. This outlet is arranged at the lower end of a threaded tubular extension 6, which is formed upon the bottom 3 and is adapted to be engaged by the threaded end of a spout 7. This spout has a semicircular plate 8 formed therein and extending thereacross, and said plate is adapted when the spout is screwed upon the extension 6 to be brought into position under the outlet 4 and prevent the escape of the contents of the receptacle. A stem 9 is arranged at the center of the edge of plate 8 and extends upward at right angles thereto and through the recess 5, before referred to. The upper end of this stem may be forked, as shown at 10, and is arranged at a point above the bottom of the receptacle.

When it is desired to discharge a portion of the contents of receptacle 1, the spout 7 is turned by hand until the plate 8 is removed from under the outlet. This operation will cause the forked end 10 of stem 9 to break or pulverize any large particles which may have accumulated above the outlet, and the contents will flow downward through outlet 4 and spout 7. The passage of the material from the receptacle can be assisted by continually turning the spout 7 back and forth, thereby causing the fork 10 to thoroughly break up large particles adjacent thereto and prevent clogging of outlet 4. After a sufficient quantity of the material has been removed from the spout 7 said spout can be turned back into such position as to bring the plate below outlet 4. It will be seen that the device is extremely simple and effective and can be constructed at slight cost.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new, and desired to be secured by Letters Patent, is—

In a device of the character described, the combination with a receptacle having an inclined bottom, and a screw-threaded tubular extension upon said bottom provided with an outlet in the end thereof; of a spout revolubly secured upon said extension, a transversely-extending plate within, and revoluble with, the spout and adapted to normally extend under the outlet and close the same, and a forked stem secured to said plate and projecting through the outlet into the receptacle, whereby the contents of the receptacle may be broken during the operation of turning the spout to open the outlet.

In testimony whereof I affix my signature in presence of two witnesses.

MARIETTA F. SIMPSON.

Witnesses:
   W. J. SIMPSON,
   H. M. CORWIN.